FLIP-FLOP HAVING JAM TRANSFER FEATURE

Filed March 20, 1964 2 Sheets-Sheet 1

INVENTOR.
GEORGE P. CHAMBERLIN
BY John V. Regan
Attorney

FIG. 2.
FOR FLIP-FLOP
| | (0) OUT | (1) OUT |
|---|---|---|
| SET | 0 | $-V_3$ |
| RESET | $-V_3$ | 0 |
FIG. 3.
FOR NEG "AND"
| IN | IN | OUT |
|---|---|---|
| 0 | 0 | 0 |
| $-V_3$ | 0 | 0 |
| 0 | $-V_3$ | 0 |
| $-V_3$ | $-V_3$ | $-V_3$ |
FIG. 4.
FOR NEG. "OR"
| IN | IN | OUT |
|---|---|---|
| 0 | 0 | 0 |
| $-V_3$ | 0 | $-V_3$ |
| 0 | $-V_3$ | $-V_3$ |
| $-V_3$ | $-V_3$ | $-V_3$ |
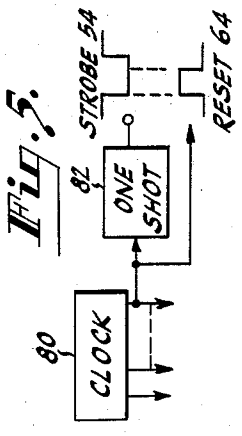
FIG. 5.
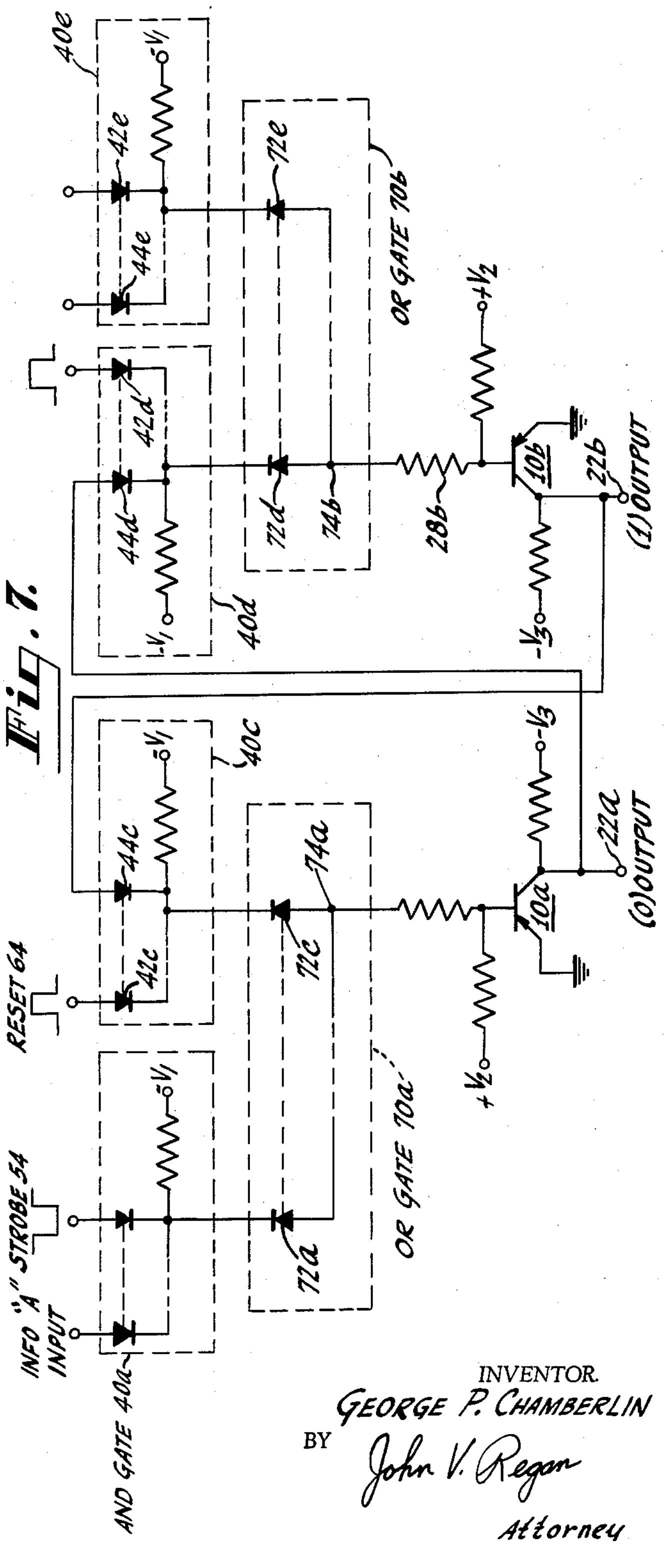
FIG. 7.
INVENTOR
GEORGE P. CHAMBERLIN
BY John V. Regan
Attorney United States Patent Office 3,254,239
Patented May 31, 1966

3,254,239
FLIP-FLOP HAVING JAM TRANSFER FEATURE
George P. Chamberlin, Cinnaminson, N.J., assignor to Radio Corporation of America, a corporation of Delaware
Filed Mar. 20, 1964, Ser. No. 353,478
7 Claims. (Cl. 307—88.5)

This invention relates to electrical circuits and, in particular, to improved flip-flop means.

In the conventional type of shift register application, information is transferred from each flip-flop stage to the next succeeding flip-flop stage by gating the (1) and (0) outputs of each flip-flop to the two different inputs of the next flip-flop. For example, the succeeding flip-flop may either become or remain "set" if the gate at the (0) output of the preceding stage is enabled, and may either become or remain reset if the gate at the (1) output of the preceding stage is enabled. Since the (1) and (0) outputs of a flip-flop are complementary, only one output gate is enabled, and the enabled gate determines the state of the succeeding stage.

In some applications, for example in register-to-register transfers such as in memory addressing, input information to a register flip-flop may come from a number of different flip-flops or other sources. In that case, the gating scheme aforementioned cannot be used because both input gates to a flip-flop would be enabled for certain input conditions, and the state assumed by the flip-flop might be indeterminate for those conditions. This problem may be avoided by first resetting the flip-flop, and thereafter gating only the (0) outputs of the sending flip-flops to the "set" input terminal of the receiving flip-flop. The receiving flip-flop becomes set only if the (0) outputs of the sending flip-flops meet certain prescribed conditions.

A characteristic of the gating scheme aforementioned is that a portion of each operating cycle is reserved for resetting the flip-flop, or flip-flops, prior to the information transfer. This is disadvantageous, in memory addressing applications for example, where a short operating cycle is of great importance for high speed. It is desirable, therefore, to provide flip-flop means in which new information may be transferred into a flip-flop without first having to reset the flip-flop to a reference condition.

Accordingly, it is one object of this invention to provide improved flip-flop means having jam transfer capability. By "jam transfer" capability is meant the ability to transfer new information to a flip-flop, as in a register-to-register transfer, without first having to reset the flip-flop to a reference state.

It is another object of this invention to shorten the operating cycle of a flip-flop, and thereby increase the operating speed, by obviating the need to reserve a portion of the operating cycle for resetting flip-flops.

It is a further object of this invention to provide a double level logic flip-flop arrangement operable to receive input information at one side of the flip-flop without the need for first resetting the flip-flop.

This invention includes a pair of transistors which have their control and output electrodes respectively cross-coupled, and which are biased for operation as a flip-flop. The flip-flop is triggerable into one state by applying a signal of a first relative value at one electrode of a first one of the transistors, and is triggerable into the other state by applying a signal of a second, different relative value at the same one electrode. One of the cross-coupling networks comprises a first coincidence gate for signals of the first value, the first gate having one input terminal coupled to the output electrode of the second transistor. The outputs of the first gate and a second coincidence gate are "ored" together and applied to the one electrode of the first transistor. Information input signals are applied at one input of the second coincidence gate. Strobe pulses of the first value are applied at another input of the second gate, and pulses of the second value are applied at the same time at an input of the first gate. The strobe pulses, which preferably have a longer duration than the pulses of the second value applied to the first gate and thereby overlap in point of time, render these pulses of the second value ineffective when all of the inputs to the second gate have the first value.

In the accompanying drawing, like reference characters denote like components, and:

FIGURES 2, 3 and 4 are "truth" tables for the flip-flop, AND gate and OR gate, respectively, of FIGURE 1;

FIGURE 5 is a block diagram of one arrangement which may be used to generate the reset and strobe pulses;

FIGURE 7 is a schematic diagram of another flip-flop arrangement which embodies the invention.

Figures 1, 6:
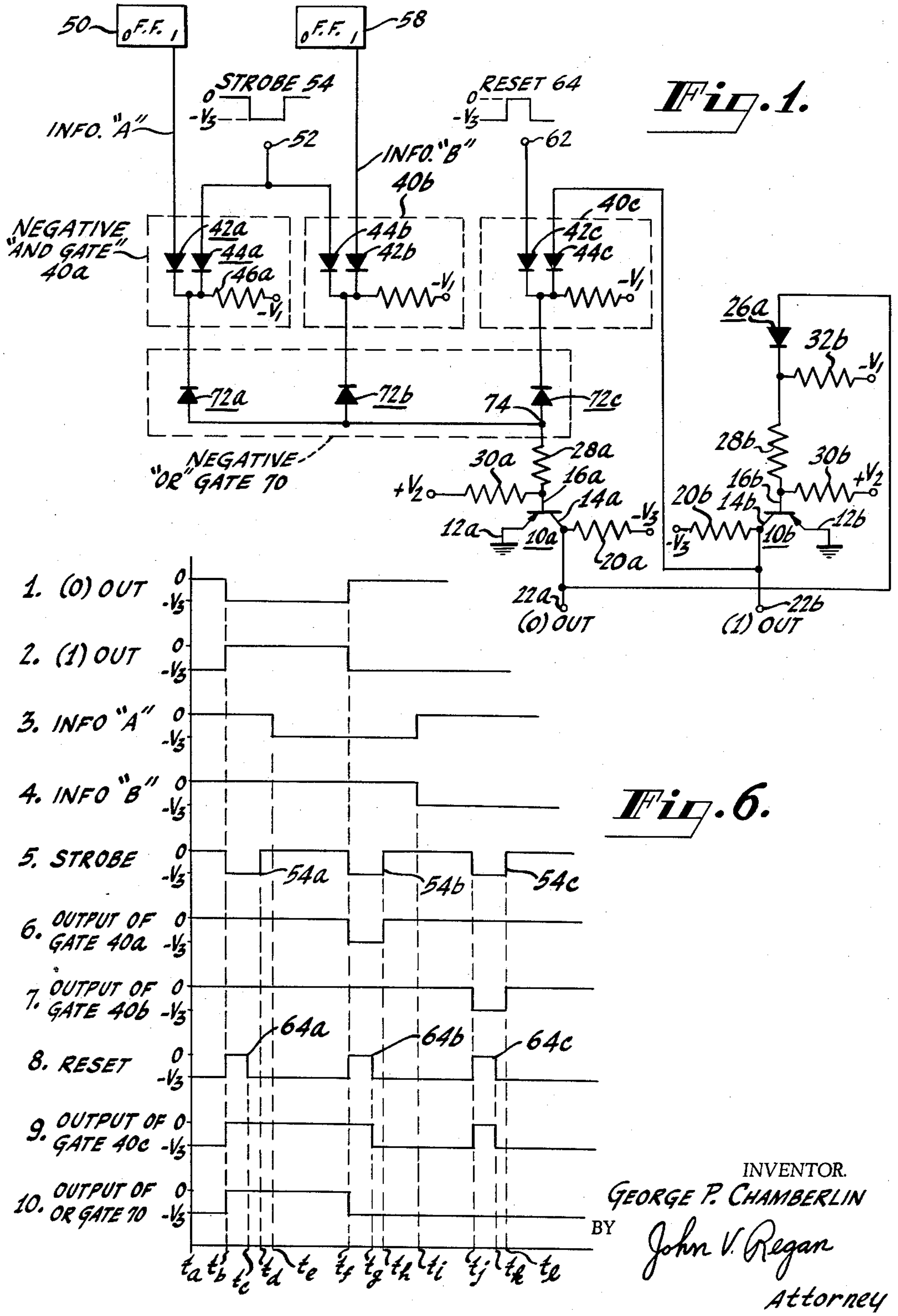
FIGURE 1 is a schematic diagram of an improved flip-flop arrangement according to the invention.
FIGURE 6 is a timing diagram useful in describing the operation of the FIGURE 1 arrangement.

The arrangement of FIGURE 1 includes a pair of transistors 10$a$, 10$b$ cross-coupled to operate as a flip-flop. Transistors 10$a$, 10$b$ are illustrated as being PNP transistors having their emitter, or common, electrodes 12$a$, 12$b$, respectively, connected to a point of reference potential, indicated by the conventional symbol for circuit ground. Resistors 20$a$ and 20$b$ connect the output, or collector, electrodes 14$a$ and 14$b$ to a source of negative bias potential, designed "$-V_3$," which may be a battery having its positive terminal connected to circuit ground. Output terminals 22$a$ and 22$b$ are connected at the respective collector electrodes. The voltage at a collector electrode, and at its associated output terminal, is approximately $-V_3$ volts when that transistor is nonconducting, and is close to ground potential when that transistor is in saturation.

The collector electrode 14$a$ of first transistor 10$a$ is cross-coupled to the control, or base, electrode 16$b$ of transistor 10$b$ by way of the series combination of a diode 26$a$ and a resistor 28$b$. A bias resistor 30$b$ is connected between the base electrode 16$b$ and a bias source of $+V_2$ volts, which may be a battery having its negative terminal grounded. A second bias resistor 32$b$ in the input network is connected between the cathode of diode 26$a$ and a source of negative bias potential of $-V_1$ volts, which may be a battery having its positive terminal grounded.

The collector electrode 14$b$ of second transistor 10$b$ is cross-coupled to the base electrode 16$a$ of first transistor 10$a$ by way of a negative AND gate 40$c$, a negative OR gate 70, and a base input network. The AND and OR gates will be described in detail hereinafter. A resistor 28$a$ connects the output of the OR gate 70 to the base electrode 16$a$, and resistor 30$a$ connects the base electrode 16$a$ to the $+V_2$ volt bias source.

In the system of FIGURE 1, a signal or level of $-V_3$ volts may be considered to represent a binary "1," and a signal or level of zero volts may represent a binary "0." That is to say, the various signals and levels are bivalued and have a value of either $-V_3$ volts or zero. Consider that the flip-flop is in the set state when second transistor 10$b$ is nonconducting and first transistor 10$a$ is in saturation. The (1) output at output terminal 22$b$ is $-V_3$ volts and the (0) output at terminal 22$a$ is zero volts for this state. These output conditions are reversed when the flip-flop is in the reset state; that is to say, the (1) output is zero volts and (0) output is $-V_3$ volts. The output conditions for the different states of the flip-flop are summarized in the "truth" table of FIGURE 2.

The input arrangement at the base electrode 16a of first transistor 10a comprises a double level of logic. The first level includes a number of negative "AND" gates 40a . . . 40c, three shown by way of example, having their outputs "ORED" together, i.e. connected to the cathodes of different diodes 72a . . . 72c, respectively, in a negative OR gate 70. OR gate 70 is in the second level of logic. The anodes of these diodes are connected together and to a common output terminal 74 at one end of the resistor 28a in the base circuit of first transistor 10a.

All of the AND gates 40a . . . 40c, shown within the dashed boxes, are structurally similar, and a description of the first gate 40a will serve as a description for all. Gate 40a comprises a pair of diodes 42a and 44a having their cathodes connected together and to one end of a resistor 46a. The other end of the resistor 46a is connected to the $-V_1$ volt bias source, which is chosen to have a value more negative than $-V_3$ volts. If either anode voltage is at zero volts, that diode conducts and clamps the voltage at the common cathode connection at approximately zero volts, neglecting the small drop across the conducting diode. When the voltages at both anodes are at $-V_3$ volts, the voltage at the common cathode connection is close to $-V_3$ volts. The term "negative AND" is descriptive of the logic performed by the gate 40a since the output of the gate is $-V_3$ volts only when both inputs, applied at the anodes of diodes 42a and 44a, are at $-V_3$ volts; the output is approximately zero volts for any other input condition. A truth table for the negative AND gate is given in FIGURE 3.

It will be apparent from the foregoing discussion that the voltages at the cathodes of diodes 72a . . . 72c in negative OR gate 70 may have a value of either zero volts or $-V_3$ volts. If the cathode voltage of any of these diodes 72a . . . 72c is $-V_3$ volts, that diode is forward biased and provides a low impedance path for current, in the conventional sense, supplied from the $+V_2$ volt source. Neglecting the small drop across the conducting diode, the voltage at the common anode connection 74 is clamped at approximately $-V_3$ volts, which is the output voltage of the OR gate. The values of the resistors 28a and 30a in the base input network of first transistor 10a are selected so that the base 16a voltage is negative relative to ground potential when the voltage at common terminal 74 is $-V_3$ volts. First transistor 10a then is biased into saturation and the (0) output voltage at output terminal 22a is at ground potential, indicating that the flip-flop is in the set state.

On the other hand, when the voltages at all of the cathodes of the diodes 72a . . . 72c are at zero volts, all of these diodes are forward biased and clamp the voltage at the OR gate output terminal 74 at ground potential, neglecting the drops across the diodes. The base 16a voltage then is positive relative to ground, by virtue of the drop across input resistor 28a, and first transistor 10a is biased in a nonconducting condition. The (0) output voltage is approximately $-V_3$ volts and the flip-flop is in the reset condition. A "truth" table for the negative OR gate 70 is given in FIGURE 4. In some applications, as for example when certain types of transistor gates are used for the coincidence gates 40a . . . 40c, the OR circuit may consist of a common connection at the output electrodes of the transistors. In that case, a physically distinct OR gate is unnecessary.

Consider now the inputs to the negative AND gates. Information signals or levels from different sources are applied at the anodes of diodes 42a and 42b in AND gates 40a and 40b. By way of example, these anodes may be connected, respectively, to the (1) output terminals of a pair of flip-flops 50, 58, which may operate in a manner defined by the "truth" table of FIGURE 2. That is to say, the voltage supplied at the anode of diode

42a is either $-V_3$ volts or zero volts as flip-flop 50 is set or reset, respectively. The anodes of the other diodes 44a and 44b in gates 40a and 40b are connected together and to a common terminal 52. The voltage at input terminal 52 normally is at ground potential, and may be switched to $-V_3$ volts upon the application of a strobe input pulse 54. The outputs of both of the gates 40a and 40b are at zero volts in the absence of a strobe pulse 54 because of the ground potential applied at input terminal 52. A gate 40a, 40b has an output of $-V_3$ volts only when the information input signal thereto is $-V_3$ volts when the strobe pulse 54 is applied.

Third AND gate 40c has a pair of diodes 42c, 44c. Diode 44c has its anode directly connected to the collector electrode 14b of the second transistor 10b in the flip-flop. Diode 42c has its anode connected to a reset input terminal 62 at which reset pulses 64 are applied. The voltage at reset terminal 62 normally is $-V_3$ volts, and rises temporarily to zero volts when a reset pulse is applied. Gate 44c has an output of zero volts while the reset pulse 64 is present, regardless of the voltage then present at the anode of diode 44c.

Reset pulse 64 and strobe pulse 54 are either applied at the terminals 62 and 52 beginning at the same time, or else strobe pulse 54 is applied slightly prior to the reset pulse 64. Strobe pulse 54, however, preferably is arranged to have a longer duration than the reset pulse 64, whereby the strobe pulse overlaps the reset pulse in point of time. By way of example only, one arrangement for deriving these pulses is shown in the block diagram of FIGURE 5. A clock 80 provides a recurring series of pulses on its various output lines. Clock 80 may be, for example, a crystal oscillator driving a number of cascaded one-shots. The periodically occurring square wave outputs on one output line of the clock 80 may be used as the reset pulse 64. These pulses also are applied to a one-shot 82, or monostable multivibrator, which is arranged to provide, when triggered, a pulse of opposite polarity and of greater duration. The one-shot 82 output may be used as the strobe pulse 54.

The operation of the FIGURE 1 circuit arrangement, and the manner in which new information may be "jammed" into the flip-flop without having to first reset the flip-flop, may best be seen by considering a few examples. Operation will be described with reference to the timing diagram of FIGURE 6, wherein the rows of waveforms are numbered consecutively and are also labeled to define the points in the FIGURE 1 circuit whereat the waveforms appear.

Assume that the flip-flop is in the set state at time $t_a$. The (1) output voltage is $-V_3$ volts and the (0) output voltage is zero volts (rows 1 and 2, FIGURE 6). The voltage at reset terminal 62 also is $-V_3$ volts (row 8), whereby both inputs to the third negative AND gate 40c are at $-V_3$ volts. The output thereof (row 9) is at $-V_3$ volts, and diode 72c in the OR gate 70 conducts and clamps the voltage at terminal 74 at $-V_3$ volts (row 10). This voltage maintains first transistor 10a in saturation, and the ground potential at its collector electrode 14a maintains second transistor 10b in the cut-off state.

A positive going reset pulse 64a (row 8) is applied at the reset terminal 62 at time $t_b$. A negative going strobe pulse 54a (row 5) is applied simultaneously at the strobe terminal 52. Both of the information inputs from flip-flops 50 and 58 are at zero volts (rows 3 and 4) indicating that these flip-flops are in the reset state. Accordingly, the outputs of gates 40a and 40b remain at zero volts (rows 6 and 7). The positive going reset pulse 64 causes the output voltage of third AND gate 40c to rise to zero volts (row 9). All of the inputs to the diodes 72a . . . 72c in the OR gate 70 then are at zero volts, and the output voltage at terminal 74 is clamped at ground potential (row 10). This voltage causes first transistor 10a to turn off (row 1), and the collector 14a voltage then falls toward $-V_3$ volts (row 1). This latter voltage is coupled to the input diode 26a at the base of second transistor 10b, dropping the base 16b voltage below ground potential and turning on second transistor 10b. The output voltage thereof (row 2) rises to ground potential, and is cross-coupled to one input of third AND gate 40c and maintains the output voltage thereof at ground potential (row 9) when the reset pulse 64a terminates at $t_c$. The flip-flop now is in the reset state. Termination of the strobe pulse 54a at time $t_d$ has no effect on the circuit operation because both the first and second AND gates 40a and 40b already have outputs of zero volts.

Information input "A," applied to first AND gate 40a, falls from zero volts to $-V_3$ volts at time $t_e$ (row 3). Input flip-flop 50 then is "set." The output of gate 40a (row 6) remains at zero volts, however, because the voltage at strobe input terminal 52 is at ground potential. The next occurring strobe pulse 54b and reset pulse 64b are applied at terminals 52 and 62, respectively, at time $t_f$. Both inputs to first AND gate 40a then are at $-V_3$ volts, whereby the output thereof also is at $-V_3$ volts. Diode 72a in OR gate 70 conducts and clamps the output voltage (row 10) thereof, at terminal 74, at $-V_3$ volts. This voltage biases first transistor 10a into conduction, whereupon the (0) output voltage rises to ground potential (row 1). This latter voltage is cross-coupled to the input of second transistor 10b and turns off the latter transistor. The (1) output voltage falls to $-V_3$ volts (row 2), and is coupled back to one input of the third AND gate 40c. The flip-flop is now in the set state.

The voltage at reset terminal 62 falls from ground potential to $-V_3$ volts, at time $t_g$, upon termination of reset pulse 64b. Both inputs to third AND gate 40c then are at $-V_3$ volts, and the output thereof falls to $-V_3$ volts (row 9). Diode 72c in OR gate 70 conducts and aids diode 72a in clamping the output voltage of OR gate 70 at $-V_3$ volts. Strobe pulse 54b terminates at $t_h$ (row 5) and the output of first AND gate 40a rises to ground potential (row 6), reverse biasing diode 72a in OR gate 70. However, the output of OR gate 70 remains at $-V_3$ volts (row 10) because of the $-V_3$ volts applied at the cathode of diode 72c. The flip-flop thus remains in the set state at the termination of the strobe pulse 54b.

Consider now what the effect would be if the output of third gate 40c remained at zero volts until after the strobe pulse 54b terminated at $t_h$. All of the inputs to OR gate 70 would be at zero volts and the output thereof would rise to ground potential. The base 16a voltage would rise above ground potential, turning off first transistor 10a and resetting the flip-flop with resultant loss of information. Clearly, such a situation is to be avoided. This situation could arise in two ways. First, the situation could arise if the strobe pulse 54b terminated before the reset pulse 64b terminated. The situation could also arise if the strobe pulse 54b and the reset pulse 64b terminated at the same time, and third gate 40c had a slower speed of response than the first (or second) AND gate 40a. It is primarily for this reason that the strobe pulses preferably are chosen to have a greater duration than the reset pulses, whereby the strobe pulses overlap the trailing edges of the reset pulses in point of time. This assures that the output of third gate 40c will reach a settled condition before the strobe pulse terminates.

Returning now to the specific example, it will be recalled that the flip-flop was switched to the set state at time $t_f$. The information input signal to first AND gate 40 rises to zero volts at time $t_i$ (row 3) and the information input to second gate 40b falls to $-V_3$ volts (row 4). The next reset pulse 64c is applied at time $t_j$ (row 8) and causes the output of third gate 40c to raise to zero volts (row 9). The ordinary result of this change in voltage would be to turn off first transistor 10a and reset the flip-flop. However, strobe pulse 54c (row 5) is applied at terminal 52 at the same time the reset pulse is applied at terminal 62. Both inputs to the second AND gate 40b then are at $-V_3$ volts (rows 4 and 5), and the output of second gate 40b falls to $-V_3$ volts. Diode 72b then conducts and clamps the output voltage of OR gate 70 at $-V_3$ volts (row 10), over-riding the effect of the reset pulse 64c and the resulting change in the output voltage of third gate 40c. There is thus no resetting of the flip-flop.

Reset pulse 64c terminates at time $t_k$, and both inputs to third gate 40c then are at $-V_3$ volts. Diode 72c again conducts and aids in clamping the output voltage of the OR gate 70 at $-V_3$ volts. Accordingly, the output of OR gate 70 remains at $-V_3$ volts after the strobe pulse terminates at time $t_l$.

It is apparent from the above discussion that the effect of an applied reset pulse is to raise the output voltage of third AND gate 40c from $-V_3$ volts to zero volts when the flip-flop is in the set state. This rise in voltage, if coupled through diode 72c to the output terminal 74 of the OR gate 70, would reset the flip-flop. Because of the particular manner in which the information, strobe, and reset pulses are applied to the circuit, however, the tendency of the reset pulse to reset the flip-flop is over-ridden when one or more of the information input signals is at $-V_3$ volt. That is to say, a reset pulse is effective either to reset the flip-flop, or to maintain the flip-flop in the reset state, only when all of the information inputs are at zero volts, representing binary (0) inputs, when the reset and strobe pulses are applied. If either or both of the information inputs is at $-V_3$ volts, the corresponding AND gate functions to produce an output which blocks any effect of the reset pulse from reaching the flip-flop. In this sense, the circuit is said to have jam transfer capability, since new information can be jammed into the flip-flop at the same time the reset pulse is applied.

FIGURE 7 is a schematic diagram of a flip-flop arrangement which includes part of the arrangement of FIGURE 1, but which is more general in application and has use as a universal circuit module. In FIGURE 7, the AND gates 40a and 40c correspond to the like-designated gates in FIGURE 1. OR gate 70a corresponds to OR gate 70 of FIGURE 1. The dotted connection between the diodes 72a and 72c of the OR gate indicates that the OR gate 70a may have other diodes (not shown) connected to receive inputs from additional AND gates (not shown). Also, the AND gates may have more than two inputs, as indicated by the dotted line connection between the cathodes of the diodes. FIGURE 7 differs structurally from the arrangement of FIGURE 1 in that the two sides of the flip-flop input network are symmetrical in FIGURE 7. The input network at the right side of the flip-flop includes two or more negative AND gates 40d, 40e having their respective outputs connected to the cathodes of diodes 72d, 72e in OR gate 70b. The output of OR gate 70b is connected to one end of the base input resistor 28b.

The flip-flop arrangement of FIGURE 7 may be operated in several different ways. For example, let it be assumed that the anode of at least one of the diodes in AND gate 40e is wired, or otherwise connected, to circuit ground, and that the anode of the diode 42d in AND gate 40d is wired, or otherwise connected, to a point of $-V_3$ volts. Under these conditions, the FIGURE 7 circuit operates in exactly the same manner as the FIGURE 1 circuit previously described. This follows from the fact that the AND gate 40e essentially is disconnected from the circuit since its output is always at ground potential. AND gate 40d has an output of $-V_3$ volts whenever transistor 10a is nonconducting. The $-V_3$ volts output of gate 40d forward biases the diode 72d in OR gate 70b and the transistor 10b is biased into conduction.

The FIGURE 7 arrangement may be operated as a control flip-flop by connecting the anodes of the diodes in gate 40e to drivers which have an output of ground potential in the normal condition. If these drivers then are activated so that the inputs to all of the diodes, 42e and 44e for example, are lowered to $-V_3$ volts, the output of gate 40e will fall to $-V_3$ volts. Diode 72e in the OR gate 70b then conducts and clamps the voltage at terminal 74b at $-V_3$ volts. This voltage biases transistor 10b into conduction, whereby the (1) output voltage will be at ground potential. This is the reset condition of the flip-flop. Accordingly, it may be seen that the gate 40e may be operated to reset the flip-flop unconditionally by means of negative-going input pulses.

Additionally, the flip-flop may be switched to the set condition by applying a positive input pulse at the anode of diode 42d in gate 40d. In such case, the anode voltage ordinarily would be controlled to have a value of $-V_3$ volts. Raising this voltage to ground potential forward biases diode 42d. AND gate 40d then has an output voltage of ground potential. Assuming that the output of gate 40e also is at ground potential at this time, OR gate 70b has an output of zero volts. This voltage turns off transistor 10b, whereupon the (1) output voltage falls to $-V_3$ volts. It can be shown that this output voltage, which is cross-coupled to the anode of diode 44c in gate 40c, is effective to turn on transistor 10a. This is the set state of the flip-flop.

The FIGURE 7 arrangement also may be used as a conventional flip-flop for shift register applications by connecting the anodes of at least one diode in each of the gates 40a and 40e to circuit ground, effectively disabling these gates. The anodes of diodes 42c and 42d in the gates 40c and 40d then may be coupled to the (1) and (0) output terminals of the flip-flop in a succeeding stage of the shift register.

Although the flip-flop arrangements of FIGURES 1 and 7 have been illustrated and described as comprising PNP transistors, it will be apparent to one skilled in the art that NPN transistors also may be used, provided that the usual changes are made in the polarities of the various bias voltages, the input pulses, and the connections to the various diodes.

What is claimed is:

1. A flip-flop arrangement comprising:
a pair of amplifying devices having first and second input terminals and corresponding first and second output terminals, the voltage at the second output terminal having a first value when the flip-flop is in the set state and having a second value when the flip-flop is in the reset state;
means coupling the first output terminal to the second input terminal;
at least two coincidence gates, each of which has an output of prescribed value only when all inputs thereto have said first value;
logical OR means connected to receive the outputs of said gates;
means coupling the output of said OR means to the first input terminal only of said first and second input terminals;
means for connecting said second output terminal to one input of a first one of the gates;
means for applying information input signals at a first input of the second gate; and
means for applying a first control pulse of the second value selectivity at a second input of the first gate and for applying a second control pulse of the first value at a second input of the second gate during the entire period of the first control pulse.

2. A flip-flop arrangement comprising:
first and second input terminals and corresponding first and second output terminals, the voltage at the second output terminal having a first value when the flip-flop is in the set state and having a second value when the flip-flop is in the reset state;
means coupling the first output terminal to the second input terminal;
at least two coincidence gates, each of which has an output of prescribed value only when all inputs thereto have said first value;
logical OR means connected to receive the outputs of said gates and having its output coupled exclusively to said first input terminal;
means for connecting said second output terminal to one input of a first one of the gates;
means for applying input signals at a first input of the second gate; and
means for applying a reset pulse of the second value selectively at a second input of the first gate and for applying a control pulse of the first value at a second input of the second gate, said control pulse being applied for the entire duration of said reset pulse and overlapping, in point of time, the trailing edge of said reset pulse.

3. The combination comprising:
a flip-flop having "set" and "reset" input terminals and corresponding first and second output terminals, the voltage at an output terminal having either a first or second value when the voltage at the corresponding input terminal has the second or first value, respectively, said flip-flop being reset by a signal of the second value applied at the reset input terminal and being set in response to a signal of the first value applied at said reset input terminal;
means coupling the first output terminal to the set input terminal;
at least two AND gates for signals of the first value;
an OR gate for signals of the first value, the OR gate having its inputs connected to receive the outputs of the AND gates and having its output applied unconditionally at the reset input terminal;
means coupling the second output terminal of the flip-flop to one input of a first one of the AND gates;
means for applying input signals at a first input of the second AND gate, said input signals having either the first value or the second value;
means for applying a reset pulse of the second value at a second input of the first AND gate; and
means for applying a strobe pulse of the first value at a second input of the second AND gate, said strobe pulse having a longer duration than the reset pulse and overlapping the trailing edge of the reset pulse in point of time.

4. In a system for handling bivalued signals having either a first or a second value, the combination comprising:
first and second inverters each having an input terminal and an output terminal, the output of an inverter having said first value when the input thereto has said second value, and vice versa;
means coupling the output terminal of the first inverter to the input terminal of the second inverter;
at least two gates which perform the logical AND function for signals of the first value;
means connected to receive the outputs of said two gates and performing the logical OR function for signals of said first value;
means applying the output of said OR means at the input terminal of the first inverter in a manner to unconditionally control the voltage at that input terminal;
means coupling the output of the second inverter to one input of a first one of the AND gates;
means applying bivalued information signals to a first input of the second AND gate;
means for selectively applying a control pulse of the second value at a second input of the first AND gate; and
means for applying a control pulse of the first value at a second input of the second AND gate, said last-mentioned pulse overlapping, in point of time, the trailing edge of the pulse applied at the second input of said first AND gate.

5. In a system wherein a binary "one" is represented by a signal having a first value of voltage and a binary "zero" is represented by a signal having a second value of voltage, the combination comprising:

first and second inverters having corresponding input and output terminals, the voltage at an output terminal having said first value when the voltage at the corresponding input terminals has said second value, and vice versa;

means coupling the output of the first inverter to the input of the second inverter;

at least two input gates, each of said gates having an output of prescribed value only when all of the inputs thereto have said first value;

a third gate connected to receive the outputs of said two input gates, said third gate providing an output voltage of said first value whenever any of the inputs thereto has said prescribed value;

means coupling the output of said third gate exclusively to the input of said first inverter;

means applying the output of said second inverter to a first input of a first one of the two input gates;

means applying information input signals to a first input of the second one of said input gates;

means for applying a control pulse of said second value at a second input of the first input gate; and means for applying a control pulse of the first value at a second input of the second input gate, said last-mentioned pulse being applied whenever the pulse is applied at the second input of the first input gate and overlapping, in point of time, the trailing edge of the pulse applied at the second input of the first input gate.

6. The combination comprising:

a pair of inverters each having an input terminal and a corresponding output terminal, the voltage at an output terminal having a first value when the voltage at the corresponding input terminal has a second value, and vice versa;

first and second coincidence gates for signals of said first value;

means connected to receive the outputs of said coincidence gates and performing the logical OR function for signals of said first value;

means coupling the output of the OR means to the input terminal of a single one only of the inverters;

means coupling the output of said single one of said inverters to the input terminal of the other inverter;

means coupling the output of said other inverter to one input of a first one of the coincidence gates;

means for applying information input signals at one input of the second coincidence gate; and means selectively applying a first control signal of said second value at a second input of the first gate and applying a second control signal of the first value concurrently at a second input of the second gate.

7. The combination as claimed in claim 6, wherein said second control signal is applied for the entire duration of the first control signal and overlaps, in point of time, the trailing edge of the first control signal.

References Cited by the Examiner

UNITED STATES PATENTS

| | | | |
|---|---|---|---|
| 2,781,968 | 2/1957 | Chenus. | |
| 3,001,140 | 4/1961 | Beck | 328—195 X |
| 3,046,485 | 7/1962 | Brown. | |
| 3,054,988 | 9/1962 | Edwards et al. | |
| 3,158,753 | 11/1964 | Creveling | 307—88.5 |

ARTHUR GAUSS, *Primary Examiner.*

I. C. EDELL, *Assistant Examiner.*